United States Patent
Yang

(10) Patent No.: US 11,454,272 B2
(45) Date of Patent: Sep. 27, 2022

(54) ECO-FRIENDLY FASTENER STRUCTURE WITH LOCKABLE STAINLESS STEEL SCREW PAIR

(71) Applicant: Chien-Fang Yang, Pingtung County (TW)

(72) Inventor: Chien-Fang Yang, Pingtung County (TW)

( * ) Notice: Subject to any disclaimer, the term of this patent is extended or adjusted under 35 U.S.C. 154(b) by 214 days.

(21) Appl. No.: 16/747,908

(22) Filed: Jan. 21, 2020

(65) Prior Publication Data
US 2021/0222725 A1    Jul. 22, 2021

(51) Int. Cl.
| F16B 39/06 | (2006.01) |
| F16B 33/00 | (2006.01) |
| F16B 43/00 | (2006.01) |
| F16B 35/00 | (2006.01) |

(52) U.S. Cl.
CPC ............ *F16B 39/06* (2013.01); *F16B 33/002* (2013.01); *F16B 43/004* (2013.01); *F16B 35/00* (2013.01)

(58) Field of Classification Search
CPC .......... F16B 39/06; F16B 37/12; F16B 35/00; F16B 33/06
USPC ......... 411/217, 321, 397, 424, 432, 900–902
See application file for complete search history.

(56) References Cited

U.S. PATENT DOCUMENTS

| 365,165 A | * | 6/1887 | Campbell et al. ...... | F16B 39/06 81/10 |
| 1,495,687 A | * | 5/1924 | Grosclaude ............. | F16B 39/06 279/100 |
| 1,518,918 A | * | 12/1924 | Griffith ................... | F16B 39/06 411/323 |
| 3,468,211 A | * | 9/1969 | Suan ....................... | F16B 35/00 411/397 |
| 4,975,014 A | * | 12/1990 | Rufin ...................... | F16B 35/00 403/30 |
| 5,961,266 A | * | 10/1999 | Tseng ...................... | F16B 37/12 411/289 |
| 6,048,151 A | * | 4/2000 | Kwee ...................... | F16B 39/06 411/948 |
| 7,922,434 B2 | * | 4/2011 | Reynolds ................ | F16B 37/12 411/432 |
| 8,105,004 B2 | * | 1/2012 | Stephen .................. | F16B 35/00 411/377 |
| 10,406,590 B2 | * | 9/2019 | Hutter, III ............... | F16B 23/00 |

\* cited by examiner

*Primary Examiner* — Flemming Saether

(74) *Attorney, Agent, or Firm* — Muncy, Geissler, Olds & Lowe, P.C.

(57) ABSTRACT

The two lockable stainless and lossless screw pairs at two ends of the bolt are provided both to avoid screw pairs stained or destroyed by strain force from loading and to decrease the cost because of energy consumption in traditional process of bolt or its cost from environmental pollution.

5 Claims, 9 Drawing Sheets

ECO-FRIENDLY FASTENER STRUCTURE WITH LOCKABLE STAINLESS STEEL SCREW PAIR

FIELD OF THE INVENTION

The invention relates to a fastener structure, in particular to an eco-friendly fastener structure with a lockable stainless steel screw pair capable of preventing loosening and reducing noise and environmental pollution.

BACKGROUND OF THE INVENTION

Conventional screw made of steel to form a device fastening two objects is usually called screw structure or fastener, hereinafter referred to simply as screw structure. The screw bolt (or screw rod) and screw nut (commonly referred to as a screw cap, hereinafter referred to as a nut) of the screw structure assembly are manufactured separately. The screw rod without a screw bolt head fastens two adjacent objects by rotating two nuts from two ends of the screw rod, which is a screw combination utilizing in the first time according to the screw physical characteristics of spiral threads inside the nuts and spiral threads outside the screw rods to gradually fasten in a fine adjustment manner and avoiding loosening through the friction length to fasten two adjacent objects. After the screw assembly fastened the two objects, due to the fact that the stress strain of the fastened two objects is changed continuously, the screw structure is continuously and repeatedly stretched or vibrated, and the nut is loosened after a long time. Therefore, the occurrence of a disaster caused by the loosening of the nut is a first disadvantage of the conventional screw assembly structure.

In order to save one of the two nuts in the fastening screw rod, the screw with the bolt head is manufactured. The screw rod with one end provided with a fixed screw head is commonly referred to as a bolt (same as the following). The conventional bolt is manufactured by straightening and cutting one end of a circular steel bar by using a cold stamping and pressing wire rod, and a bolt head of a hexagon nut-like shape is manufactured, so that the bolt head is prefabricated. The stamping process generates huge impact noise, which is very unfavorable for field operators and the surrounding environment, and even causes environmental pollution problems. This is a second disadvantage of bolt manufacture.

Bolt manufacturing of screw assemblies often begins with a heat treatment process in which wire rod material is first heated to sphericize the lattice of the wire rod material and then annealed. This is to soften the rigidity of the wire rod for easily straightening and cutting, and for easily stamping out bolt heads and screw teeth. Then the formed bolt is subjected to heat treatment for hardening again, the repeated heat treatment process wastes huge energy, and it is a third disadvantage that the manufacturing process of the conventional bolt head is very complicated, high in energy consumption and disadvantageous in environmental protection.

The screw assembly can fasten two or more objects along the thread track by utilizing the friction principle that the circular surface of the screw assembly increases the rotating inclined surface of the screw assembly. Therefore, a pair of screw pairs formed by the external threads of the bolt and the internal threads of the nut bear great stress on the spiral rotating inclined plane; in order to withstand the corrosion caused by moisture so as to avoid the deformation and damage of the screw pair, a bolt and a nut for which a surface galvanizing antirust treatment is performed or which are made of an all-stainless steel material are adopted. In order to prevent the screw pair formed by the external screw thread of the bolt and the internal screw thread of the nut from collapsing due to rusting, it is known to prevent rust by zinc-chromium plating on the surface of the screw thread. In order to prevent rust with zinc-chromium plating, a large amount of capital for heavy metal pollution prevention equipment must be invested, so that the treatment of heavy metal polluted water is expensive. Therefore, the screw unit cost is increasing, which has caused the crisis of screw industry in global cost competitiveness. This is a fourth disadvantage of conventional screw pair rust protection processes.

Due to the four defects of the whole screw manufacturing process, it must be innovated in the screw manufacturing method or changed in the fastening technology of the product structure, so as to solve the problems of thread rust prevention, noise, water quality heavy metal pollution treatment cost, energy consumption and the like in the traditional manufacturing process at the same time, so that the advanced technology can meet the standard of industrial safety and environmental protection requirements.

SUMMARY OF THE INVENTION

The invention provides the fastening device with a lockable and stainless steel screw pair and the noise reduction environment-friendly manufacturing process of the fastening device, thereby solving the four disadvantages of the prior art.

In one embodiment, the invention provides an eco-friendly fastener structure with a lockable stainless steel screw pair comprising:

a screw rod with a thread and a first single groove on an outer wall, wherein the screw rod with the thread and the first single groove on the outer wall is formed by welding a first stainless steel pipe sleeve and a circular steel column rod inserted in the first stainless steel pipe sleeve, and the thread and the first single groove is provided on an outer wall of the first stainless steel pipe sleeve;

the circular steel column rod, wherein an outer diameter of the circular steel column rod is equal to an inner diameter of the first stainless steel pipe sleeve;

the first stainless steel pipe sleeve, made by rolling the thread of a screw on the outer wall of the first stainless steel pipe sleeve and cutting the first single groove on the outer wall in a direction parallel to a central axis;

the first single groove, located in a head end part of the screw rod provided with the thread and the first single groove on the outer wall and defined as a screw rod head end groove, and the first single groove located in a screw rod tail end part of the screw rod provided with the thread and the first single groove on the outer wall and defined as a screw rod tail end groove;

a head end nut, formed by welding a head equilateral hexagonal steel column with a round hole and a head stainless steel pipe sleeve inserted therein, wherein a thread and a head single groove are provided on an inner wall of the head stainless steel pipe sleeve, and the head single groove is parallel to a central axis of the head end nut;

a tail end screwing nut, formed by welding a tail equilateral hexagonal steel column with an another round hole and a tail stainless steel pipe sleeve inserted therein, wherein a thread and a plurality of grooves is provided on an inner wall of the tail stainless steel pipe sleeve, and wherein the plurality of grooves are respectively parallel to a central axis of the tail end screwing nut and are in parallel and are equally and mutually separated from each other on the inner wall of the nut at a same angle;

two fastened objects;

two gaskets, wherein a first gasket is arranged between the head end nut and the two fastened objects, and a second gasket is arranged between the two fastened objects and a spring gasket;

the spring gasket, the spring gasket is arranged between the second gasket and the tail end screwing nut;

a fastening screw device composed of a pin component, wherein a length of the pin is greater than or equal to that of the screw rod with the thread and the first single groove on the outer wall, and the device first rotates the head end nut into the head end of the screw rod, aligns the head single groove with the screw rod head end groove, and then inserts the pin into a head common groove formed by the head single groove and the screw rod head end groove from the head end nut side, such that a lockable screw rod head end screw pair is formed, the lockable screw rod head end screw pair locked by first inserting the pin can be fixed to support a force of rotating of the tail end screwing nut to fasten the two fastened objects, and further screws tightly the tail end screwing nut to fasten the two fastened objects by screwing the tail end screwing nut after the spring gasket snugged tightly until two functions are achieved simultaneously, wherein a first function is to reach a predetermined tightening force value; and a second function is to achieve the forming of rotating the tail end screwing nut until one groove of the plurality of grooves thereof is aligned to the screw rod head end groove and then extending and inserting the pin into a tail common groove formed by the one groove of the plurality of grooves of the tail end screwing nut and the screw rod head end groove, to simultaneously achieve the purposes of preventing corrosion damage and fastening the fastener structure to be never loosened by the lockable stainless steel screw pair.

In one embodiment, the invention provides an eco-friendly fastener structure with a lockable stainless steel screw pair, which is an eco-friendly fastener structure with lockable stainless steel screw pairs at two ends, the fastener structure including:

a screw rod with threads and single grooves on outer walls of two ends, wherein the screw rod is formed by respectively inserting a head end stainless steel pipe sleeve with a thread and a single groove on an outer wall and a tail end stainless steel pipe sleeve with a thread and a single groove on an outer wall at two ends of a circular steel column rod, a middle section between the head end and the tail end is composed by welding a middle section stainless steel pipe sleeve without thread and without single groove on an outer wall;

the circular steel column rod, wherein an outer diameter of the circular steel column rod is equal to an inner diameter of the head end stainless steel pipe sleeve with the thread and the single groove on the outer wall and an inner diameter of the tail end stainless steel pipe sleeve with the thread and the single groove on the outer wall, and an outer diameter of the middle section of the circular steel column rod is equal to an inner diameter of the middle section stainless steel pipe sleeve without thread and single groove on the outer wall;

the head end stainless steel pipe sleeve with the thread and the single groove on the outer wall, formed by rolling a thread of a screw on an outer wall of a stainless steel pipe, and cutting a screw rod head end groove on the outer wall in a direction parallel to a central axis;

a screw rod head end groove, wherein the screw rod head end groove at a head end part of the screw rod with threads and single grooves on outer walls of two ends is defined as the screw rod head end groove; and the tail end stainless steel pipe sleeve with the thread and the single groove on the outer wall, made by rolling a thread of a screw on an outer wall of a stainless steel pipe, and cutting a screw rod tail end groove on the outer wall in a direction parallel to a central axis;

the screw rod tail end groove, wherein the screw rod tail end groove at a tail end part of the screw rod with threads and single grooves on outer walls of two ends is defined as the screw rod tail end groove;

the middle section stainless steel pipe sleeve without thread and without single groove on an outer wall, which is a stainless steel pipe sleeve without rolling a thread of a screw on an outer wall of the stainless steel pipe sleeve and without a screw rod groove; and a head end nut, wherein the head end nut is formed by inserting a stainless steel pipe sleeve with a thread and a single groove on an inner wall into an equilateral hexagonal steel column with a round hole therein for welding, and the single groove of the stainless steel pipe sleeve with the thread and the single groove on the inner wall is parallel to the central axis of the head end nut; and a tail end screwing nut, wherein the tail end screwing nut is formed by inserting a stainless steel pipe sleeve with a thread and a plurality of grooves on an inner wall into an equilateral hexagonal steel column with a round hole therein for welding, and the plurality of grooves of the stainless steel pipe sleeve with the thread and the plurality of grooves on the inner wall are respectively parallel to the central axis of the tail end screwing nut, and the three grooves are in parallel and are equally and mutually separated from each other on the inner wall of the nut at a same angle;

two fastened objects;

two gaskets, wherein a first gasket is arranged between the head end nut and the fastened object, and a second gasket is arranged between the fastened object and a spring gasket;

the spring gasket, arranged between the second gasket and the tail end screwing nut;

a fastening screw device consisting of a head end pin and a tail end pin, wherein a length of the head end pin is greater than or equal to a length of the screw rod head end groove with the thread and the single groove on the outer wall, a length of a tail end pin is greater than or equal to a length of the screw rod tail end groove with the thread and the single groove on the outer wall, wherein the fastening screw device is formed by the following steps, rotating the head end nut into the head end of the screw rod, aligning the single groove in the head end nut with the screw rod head end groove, and inserting the head end pin from the head end nut end to form a lockable screw rod head end screw pair, the lockable screw rod head end screw pair is fixed to support a force of rotating of the tail end screwing nut to fasten the two fastened objects, screwing the tail end screwing nut tightly to fasten the two fastened objects, and screwing the tail end screwing nut after the spring gasket snugged tightly until two functions are achieved simultaneously, wherein a first function is to reach a predetermined tightening force value, and a second function is to simultaneously achieve the forming of rotating one groove of the plurality of grooves of the tail end screwing nut until the one groove aligned to the screw rod tail end groove and then inserting the tail end pin into a common groove formed by the one groove of the tail end screwing nut and the screw rod tail end groove, to simultaneously achieve the purposes of preventing corrosion damage and fastening the fastener structure to be never loosened by the lockable stainless steel screw pair.

The structure can simultaneously achieve the purposes of preventing the screw from loosening to avoid public security accidents, reducing noise pollution caused by manufacturing the bolt head to protect physical and mental health of workers, reducing heat consumption to save energy and reduce pollution so as to facilitate long-term maintenance of a healthy environment.

The eco-friendly fastener structure with the lockable stainless steel screw pair provided by the invention has the environmental-friendly contributions of saving energy, shortening the operation process, reducing noise, reducing environmental pollution, reducing the pollution of dirty oil to the operation air and the discharge water quality, reducing the waste of invalid space of the wire rod and the transportation energy, and the like. Thus, it can become the "eco-friendly" fastener structure with the lockable stainless steel screw pair.

DETAILED DESCRIPTION OF THE PREFERRED EMBODIMENTS

Figure 1A:
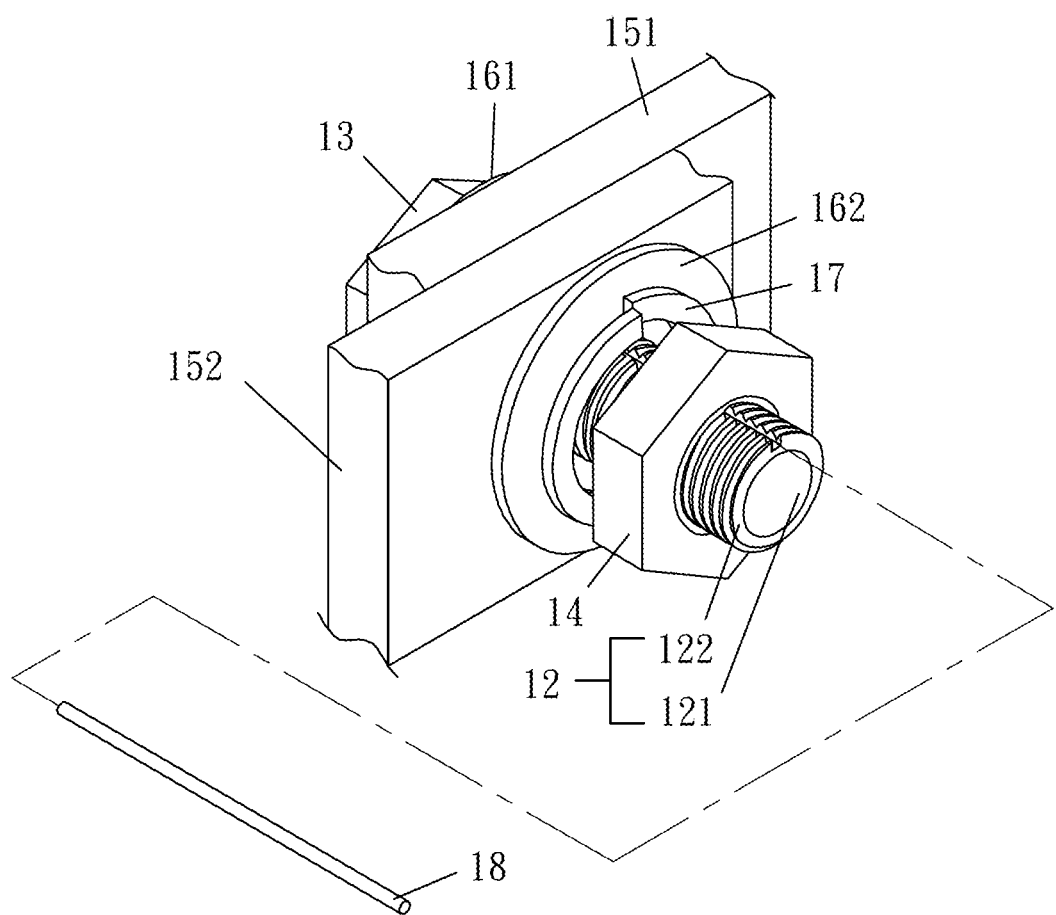
FIG. 1A is a perspective view of an eco-friendly fastener structure with a lockable stainless steel screw pair.
Figure 1B:
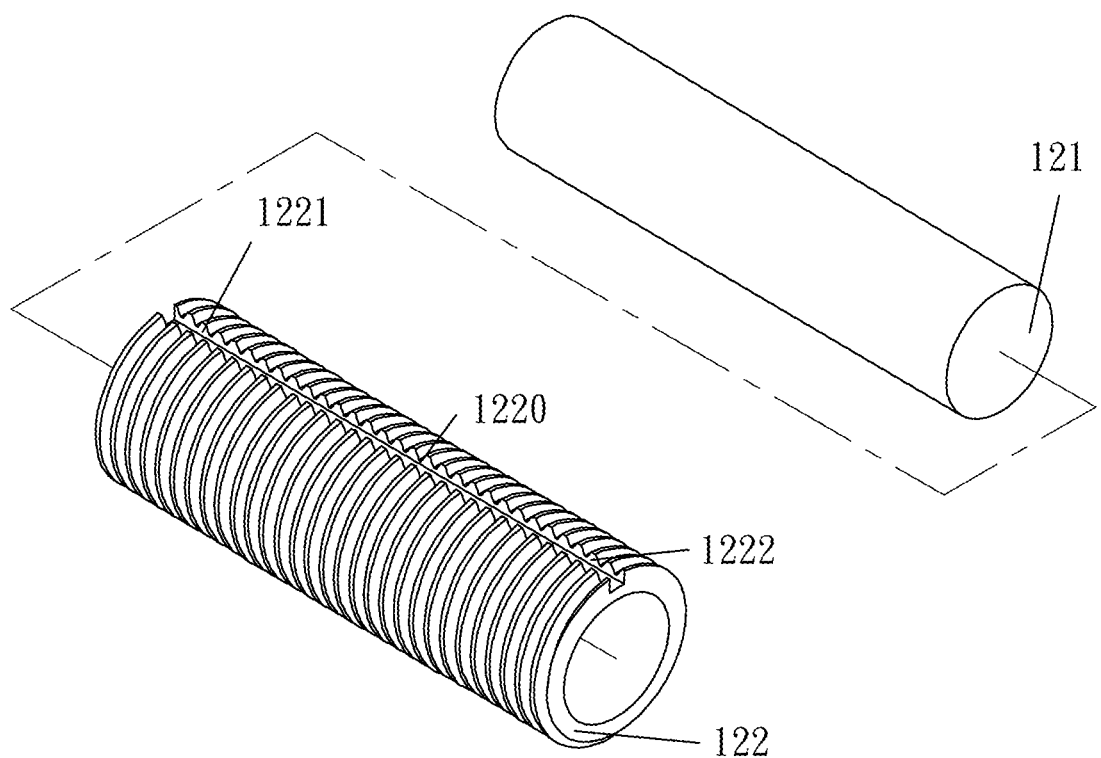
FIG. 1B is a perspective view of a screw structure with a thread and a single groove on an outer wall.
Figure 1C:
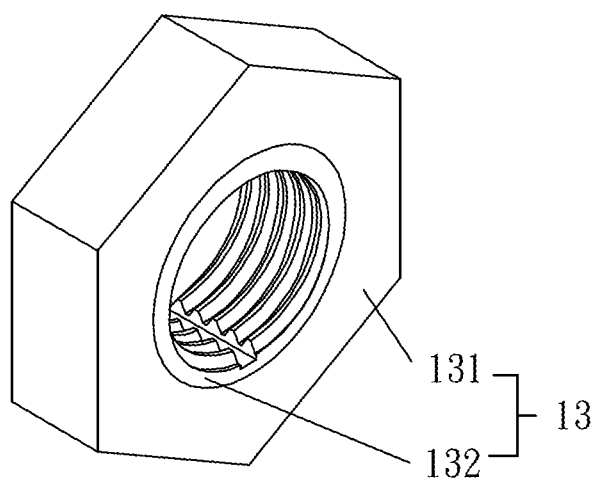
FIG. 1C is a perspective view of a head end nut structure.
Figure 1D:
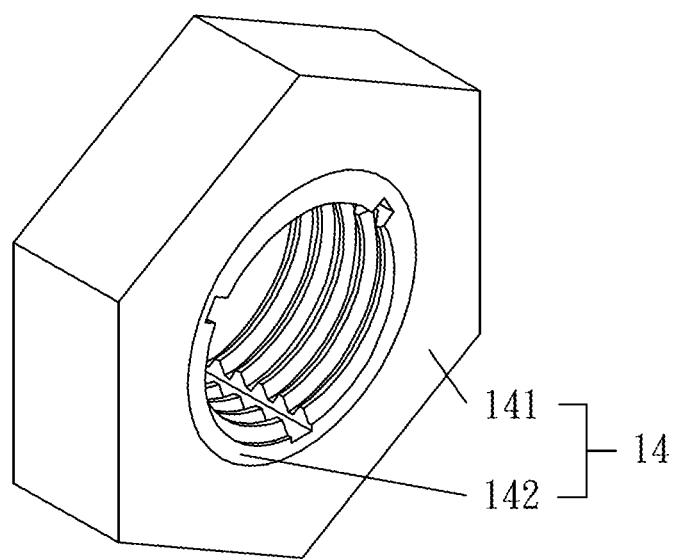
FIG. 1D is a perspective view of a tail end screwing nut structure with three grooves.

FIG. 1A is a perspective view of an eco-friendly fastener structure with a lockable stainless steel screw pair, FIG. 1B is a perspective view of a screw structure with a thread and a single groove on an outer wall, FIG. 1C is a perspective view of a head end nut structure, and FIG. 1D is a perspective view of a tail end screwing nut structure with three grooves. The eco-friendly fastener structure with the lockable stainless steel screw pair shown in FIG. 1A comprises the following components: 12 is a screw rod with a thread and a single groove on an outer wall, 13 is a head end nut, 14 is a tail end screwing nut, 151 is a fastened object, 152 is a fastened object, 161 is a gasket, 162 is a gasket, 17 is a spring gasket, and 18 is a pin, which is a fastener device structure composed of the components thereof.

According to the eco-friendly fastener structure with the lockable stainless steel screw pair of the present invention, as shown in the perspective view of the screw structure with the thread and a single groove on an outer wall of FIG. 1B, the screw rod 12 with the thread and the single groove on the outer wall is formed by inserting a circular steel column rod 121 into a stainless steel pipe sleeve 122 with a thread and a single groove on an outer wall for welding, and an outer diameter of the circular steel column rod is equal to an inner diameter of the stainless steel pipe sleeve with the thread and the single groove on an outer wall. The stainless steel pipe sleeve 122 with the thread and the single groove on the outer wall is formed by rolling thread of a screw on an outer wall of a stainless steel pipe, and cutting a screw rod groove 1220 on the outer wall in a direction parallel to a central axis of the stainless steel pipe. The screw rod groove 1220 at a head end part of the screw rod 12 with the thread and the single groove on the outer wall is called a screw rod head end groove 1221, and the screw rod groove 1220 in a screw rod tail end part of the screw rod 12 with the thread and the single groove on the outer wall is called a screw rod tail end groove 1222. FIG. 1C is a perspective view of the head end nut structure, wherein the head end nut 13 is formed by inserting a stainless steel pipe sleeve 132 with a thread and a single groove on an inner wall into an equilateral hexagonal steel column 131 with a round hole therein for welding, and the single groove of the stainless steel pipe sleeve 132 with the thread and the single groove on the inner wall is parallel to a central axis of the head end nut 13. FIG. 1D is a perspective view of a tail end screwing nut structure, wherein the tail end screwing nut 14 is formed by inserting a stainless steel pipe sleeve 142 with a thread and three grooves on an inner wall into an equilateral hexagonal steel column 141 with a round hole therein for welding, wherein the three grooves of the stainless steel pipe sleeve 142 with the thread and the three grooves on the inner wall are respectively parallel to the central axis of the tail end screwing nut with the three grooves 14, and the three grooves are in parallel and are equally and mutually separated from each other at the inner wall of the nut at an angle of 120 degrees. A first gasket 161 of the two gaskets is arranged between the head end nut 13 and the fastened object 151, and a second gasket 162 is arranged between the fastened object 152 and the spring gasket 17; the spring gasket 17 is disposed between the second gasket 162 and the tail end screwing nut 14.

Figure 2:
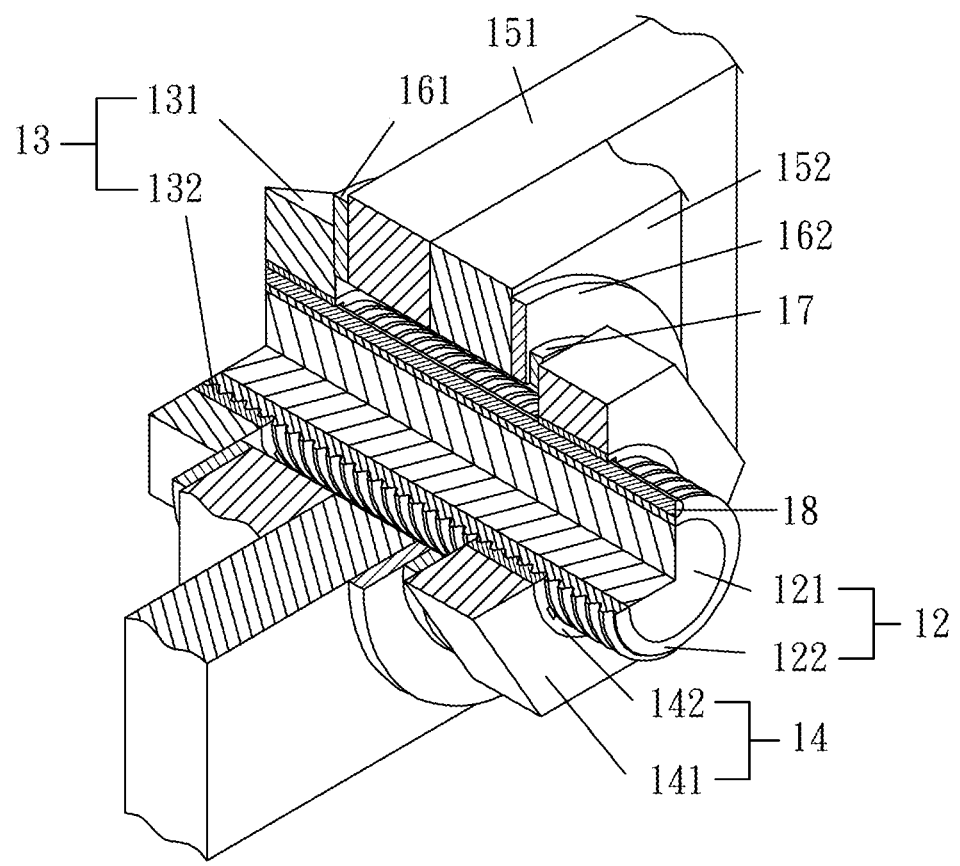
FIG. 2 is a sectional view of the eco-friendly fastener structure with the lockable stainless steel screw pair.

The device first rotates the head end nut 13 into the head end of the screw rod, align the single groove in the head end nut with the screw rod head end groove 1221, and then inserts the pin 18 into a common groove formed by the single groove in the head end nut and the screw rod head end groove 1221 from the head end nut side, such that a lockable screw rod head end screw pair is formed. The lockable screw rod head end screw pair can be fixed to support a force of rotating of the tail end screwing nut 14 to fasten the fastened object 151 and the fastened object 152. However, according to the Research Council on Structural Connections (RCSC) nut screwing standard, the device firstly screws tightly the tail end screwing nut 14, and then further screws the tail end screwing nut with three grooves 14 by 120±30 degrees after the spring gasket 17 snugged tightly, and the following two functions can be achieved simultaneously: the first function is to reach a predetermined tightening force value; and the second function is to simultaneously achieve the forming of the lockable stainless steel screw pair structure by rotating one groove of the three grooves of the tail end screwing nut until the one groove aligned to the screw rod head end groove to form the common groove and then extending and inserting the pin 18 into the common groove, as shown in the sectional view of the sectional view of the eco-friendly fastener structure with the lockable stainless steel screw pair in FIG. 2. Further, the pin 18 not only can prevent the two fastened objects from loosening in vibration during fastened with the pin, but also can be pulled out and disassembled repeatedly during later maintenance operation in the meantime. FIG. 2 is a sectional view of the eco-friendly fastener structure with the lockable stainless steel screw pair. The three grooves of the tail end screwing nut 14 are in parallel and are equally and mutually separated from each other at the inner wall of the nut at an angle of 120 degrees, and the three grooves on the inner wall are respectively parallel to the central axis of the tail end screwing nut 14. In one field embodiment, sometimes after screwing the tail end screwing nut with the three grooves by a range of 120±30 degrees, the predetermined tightening force value is not reached; therefore, a tail end screwing nut with six grooves is adapted as a replacement to reach the standard of screwing a range of 120±30 degrees. The six grooves of the tail end screwing nut with the six grooves are in parallel and are equally and mutually separated from each other at the inner wall of the nut at an angle of 60 degrees, and it can be fine-adjusted more flexibly to achieve the purpose of more accurate predetermined tightening force and never loosening. In other application, a tail end screwing nut with multiple grooves is adapted as a replacement to achieve the purpose of more accurate predetermined tightening force and never loosening. Two stainless steel screw pairs such as the head end stainless steel screw pair and a tail end stainless steel screw pair jointly form lockable stainless steel screw pairs, so that damage of stressed threads in the screw pair due to corrosion can be prevented, and the purpose of never loosening of fastening the fastener screw device can be achieved.

Furthermore, the grooves of two stainless steel screw pairs such as the head end stainless steel screw pair and the tail end stainless steel screw pair can be injected with Graphyene to achieve the effect of dissipating the heat of strain changes in the two stainless steel screw pairs.

In the innovative screw structure, the device first rotates the head end nut 13 into the head end of the screw rod, align the single groove in the head end nut with the screw rod head end groove 1221, and then inserts the pin 18 into a common groove formed by the single groove in the head end nut and the screw rod head end groove 1221 from the head end nut side, such that a nut with the lockable screw rod head end screw pair is formed. The device can be considered as a substitution of the bolt head of a conventional bolt so as to fix the screwing action of the screw. The structure can solve the problem of huge impact noise generated by cold rolling and stamping of manufacturing bolt head of the conventional bolt. Therefore, the invention is beneficial to the health of field operators and the quiet effect of the surrounding environment, and solves the second disadvantage caused by the manufacture of the conventional screw component structure.

In one embodiment, an eco-friendly fastener structure with a lockable stainless steel screw pair is described, which is an eco-friendly fastener structure with lockable stainless steel screw pairs at two ends.

Figure 3A:
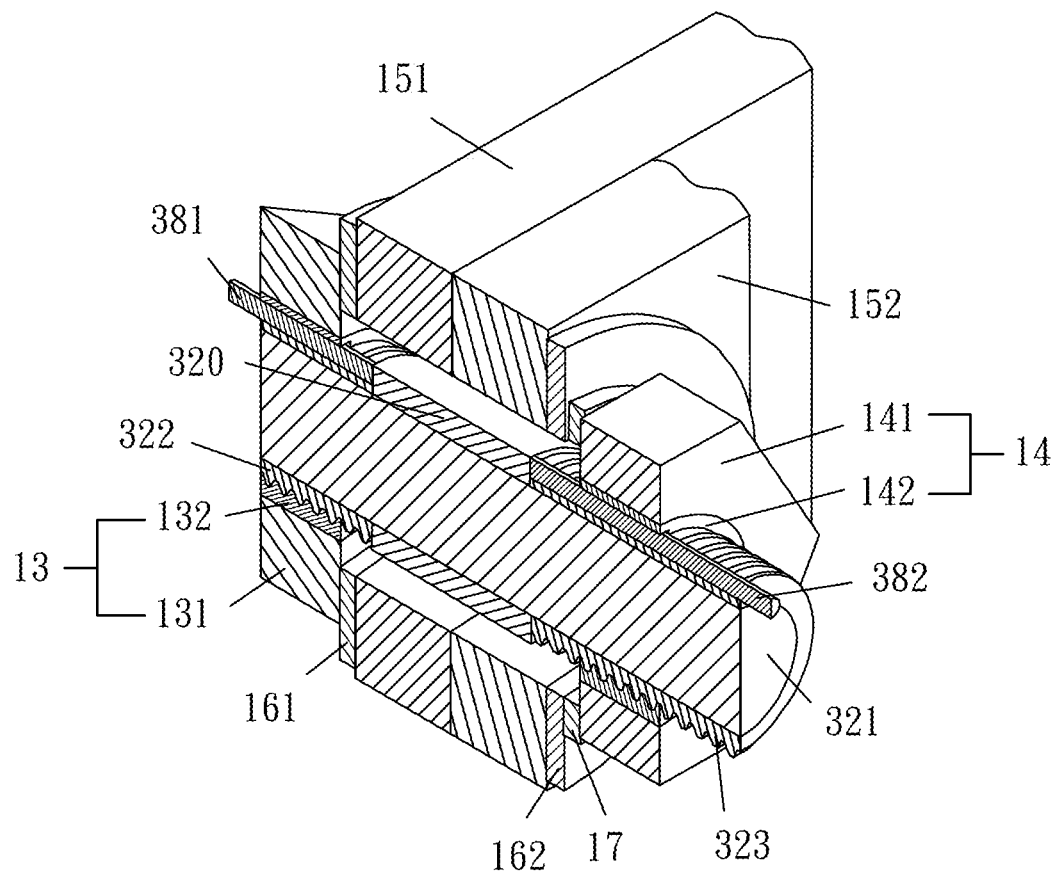
FIG. 3A is a sectional view of an eco-friendly fastener structure with lockable stainless steel screw pairs at two ends.
Figure 3B:
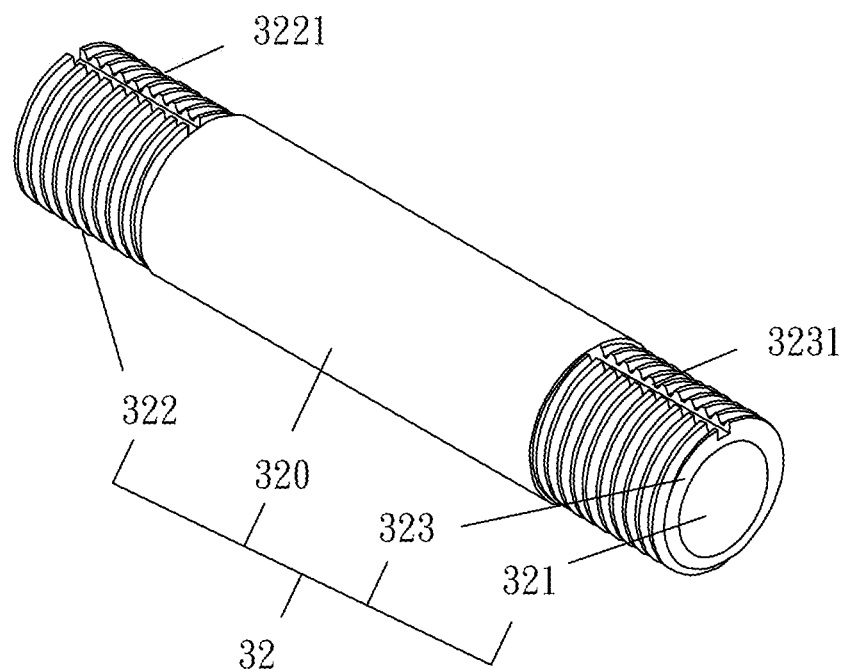
FIG. 3B is a perspective view of a screw rod structure with threads and single grooves on an outer wall at two ends.

The embodiment illustrates an eco-friendly fastener structure with lockable stainless steel screw pairs at two ends, wherein FIG. 3A is a sectional view of an eco-friendly fastener structure with lockable stainless steel screw pairs at two ends, and FIG. 3B is a perspective view of a screw rod structure with threads and single grooves on an outer wall at two ends. The structure shown in FIG. 3A includes the following components: "32" is a screw rod with threads and single grooves on an outer wall of two ends, "13" is a head end nut, "14" is a tail end screwing nut, "151" is a fastened object, "152" is a fastened object, "161" is a gasket, "162" is a gasket, "17" is a spring gasket, "381" is a head end pin, "382" is a tail end pin. The foresaid components and the like constitute the fastening device structure.

According to the embodiment of the invention, in the eco-friendly fastener structure with lockable stainless steel screw pairs at two ends, FIG. 3B is a perspective view of a screw rod structure with threads and single grooves on an outer wall at two ends, as shown in the figure, the screw rod 32 with the threads and the single grooves on the outer wall of the two ends is formed by respectively inserting a head end stainless steel pipe sleeve 322 with a thread and a single groove on an outer wall and a tail end stainless steel pipe sleeve 323 with a thread and a single groove on an outer wall at two ends of a circular steel column rod 321 for welding, and welding a middle section stainless steel pipe sleeves 320 without thread and single groove on an outer wall at a middle section between the head end and the tail end; wherein an outer diameter of a head end of the circular steel column rod 321 is equal to an inner diameter of the head end stainless steel pipe sleeve 322 with the thread and the single groove on the outer wall, an outer diameter of a tail end of the circular steel column rod 321 is equal to an inner diameter of the tail end stainless steel pipe sleeve 323 with the thread and the single groove on the outer wall, and an outer diameter of the middle section of the circular steel column rod 321 is equal to an inner diameter of the middle section stainless steel pipe sleeve 320 without thread and single groove on the outer wall.

The head end stainless steel pipe sleeve 322 with the thread and the single groove on the outer wall is formed by rolling a thread of a screw on an outer wall of a stainless steel pipe, and cutting a screw rod head end groove 3221 on the outer wall in a direction parallel to a central axis of the stainless steel pipe; and the screw rod head end groove 3221 at the head end part of the screw rod 32 with the threads and the single grooves on the outer wall of the two ends is called the screw rod head end groove 3221. The tail end stainless steel pipe sleeve 323 with the thread and the single groove on the outer wall is made by rolling a thread of a screw on an outer wall of a stainless steel pipe, and cutting a screw rod tail end groove 3231 on the outer wall in a direction parallel to central axis of the stainless steel pipe; and the screw rod tail end groove 3231 at the tail end part of the screw rod 32 with the threads and the single grooves on the outer wall of the two ends is called the screw rod tail end groove 3231. The head end nut 13, as shown in FIG. 1C which is a perspective view of a head end nut structure, is formed by inserting the stainless steel pipe sleeve 132 with the thread and the single groove on the inner wall into the equilateral hexagonal steel column 131 with the round hole therein for welding, and the single groove of the stainless steel pipe sleeve 132 with the thread and the single groove on the inner wall is parallel to the central axis of the head end nut 13. The tail end screwing nut 14, as shown in FIG. 1D which is a perspective view of a tail end screwing nut structure with three grooves, is formed by inserting the stainless steel pipe sleeve 142 with the thread and the three grooves on the inner wall into the equilateral hexagonal steel column 141 with the round hole therein for welding, wherein the three grooves of the stainless steel pipe sleeve 142 with the thread and the three grooves on the inner wall are respectively parallel to the central axis of the tail end screwing nut 14, and each of the three grooves are in parallel and are equally and mutually separated from the inner wall of the nut at an angle of 120 degrees. A first gasket 161 is arranged between the head end nut 13 and the fastened object 151, and a second gasket 162 is arranged between the fastened object 152 and the spring gasket 17; the spring gasket 17 is disposed between the second gasket 162 and the tail end screwing nut 14. A length of a head end pin 381 is not less than a length of the screw rod head end groove 3221 with the thread and the single groove on the outer wall, and a length of a tail end pin 382 is not less than a length of the screw rod tail end groove 3231 with the thread and the single groove on the outer wall.

The device first rotates the head end nut 13 into the head end of the screw rod 32, align the single groove in the head end nut with the screw rod head end groove 3221, and then inserts the head end pin 381, such that a lockable screw rod head end screw pair is formed. The lockable screw rod head end screw pair can be fixed to support a force of rotating of the tail end screwing nut 14 to fasten the fastened object 151 and the fastened object 152. However, according to the Research Council on Structural Connections (RCSC) nut screwing standard, the device firstly screws the tail end screwing nut 14 tightly, and then further screws the tail end screwing nut 14 by 120±30 degrees after the spring gasket 17 snugged tightly, and the following two functions can be achieved simultaneously: the first function is to reach a predetermined tightening force value; and the second function is to simultaneously achieve the forming of the lockable stainless steel screw pairs at two ends structure by rotating one groove of the three grooves of the tail end screwing nut until the one groove aligned to the screw rod tail end groove 3231 to form the common groove and then extending and inserting the tail end pin 382 into the common groove.

In this embodiment, the three grooves of the tail end screwing nut are in parallel and are equally and mutually separated from each other at the inner wall of the nut at an angle of 120 degrees, and the three grooves on the inner wall are respectively parallel to the central axis of the tail end screwing nut 14. In one field embodiment, sometimes after screwing the tail end screwing nut with the three grooves by a range of 120±30 degrees, the predetermined tightening force value is not reached; therefore, a tail end screwing nut with six grooves is adapted as a replacement to reach the standard of screwing a range of 120±30 degrees. The six grooves of the tail end screwing nut with the six grooves are in parallel and are equally and mutually separated from each other at the inner wall of the nut at an angle of 60 degrees, and it can be fine-adjusted more flexibly to achieve the purpose of more accurate predetermined tightening force and never loosening. In other application, a tail end screwing nut with multiple grooves is adapted as a replacement to achieve the purpose of more accurate predetermined tightening force and never loosening. Two stainless steel screw pairs such as the head end stainless steel screw pair and the tail end stainless steel screw pair jointly form lockable stainless steel screw pairs, so that damage of stressed threads in the screw pair due to corrosion can be prevented, and the purpose of never loosening of fastening the fastener screw device can be achieved.

Figure 4:
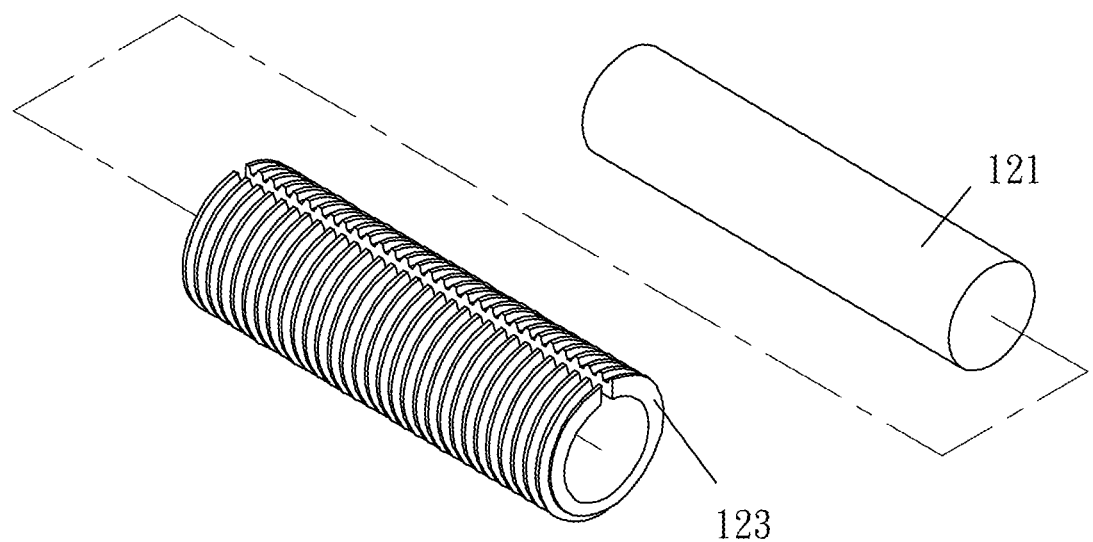
FIG. 4 is a perspective view of a notched stainless steel pipe sleeve with a thread and a single groove on an outer wall.
Figure 5:
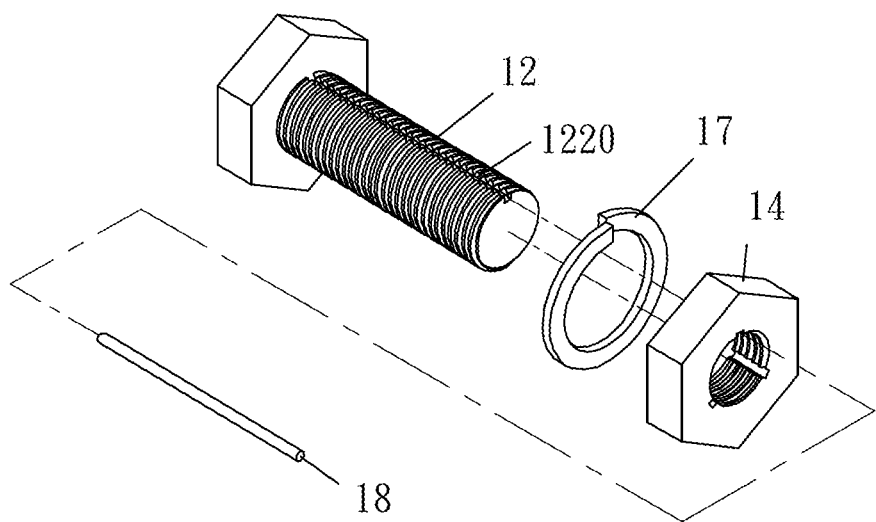
FIG. 5 is a perspective view of a basic fastener structure with a lockable stainless steel screw pair at one end.

In the foregoing description and embodiments of the invention set forth, elements are involved with reference numbers in various details, all of which may be considered to be identical or functionally similar, and are intended to illustrate, by way of example, the principal features of implementation in a very simplified pictorial representation; thus, the drawings are not intended to depict all features of an actual embodiment, nor are they intended to depict the relative sizes and numbers of components depicted. Accordingly, the drawings are not drawn in accordance with scale, but are drawn in accordance with the various structures of components of the structure of the eco-friendly fastener structure with lockable stainless steel screw pair of the present invention, wherein the various structures can achieve to prevent corrosion damage, to fasten the fasten screw device, and to achieve the basic spirit components of the target structure of never loosen. In addition, the device is only used as a representative of the device for preventing corrosion damage and locking the fastening screw device to be never loosened by using a lossless stainless steel screw pair, and can be various forms which can play functions equivalently and be applied. For example, the stainless steel pipe sleeve 122 with the thread and the single groove on an outer wall shown in FIG. 1B which is a perspective view of a screw structure with a thread and a single groove on an outer wall, can also be replaced by the notched stainless steel pipe sleeve 123 with the thread and the single groove on the outer wall to form the screw rod structure with the thread and the single groove on the outer wall. The notched stainless steel pipe sleeve 123 with the thread and the single groove on the outer wall may also be formed by rolling a square stainless steel sheet through a rolling machine and simultaneous cold stamping the same to form the teeth. FIG. 4 is a perspective view of a notched stainless steel pipe sleeve with a thread and a single groove on an outer wall. Further, a middle stainless steel pipe sleeve 320 of the screw rod structure with threads and single grooves on an outer wall at two ends, as shown in FIG. 3B, can also be replaced by a waterproof coating pipe sleeve to form the component structure. Alternatively, according to the cost requirement, it is also possible to manufacture a conventional screw rod structure to have the fastener structure with a lockable stainless steel screw pair at one end as shown in FIG. 5, so as to prevent the loosening, wherein although the screw bolt which is an all-stainless steel bolt does not depart from the manufacturing process starting from an all-stainless steel wire rod and is not an environment-friendly screw structure, its inventiveness is to prevent loosing. FIG. 5 is a perspective view of a basic fastener structure with a lockable stainless steel screw pair at one end. In the device shown in FIG. 1A, a screw rod 12 with the thread and the single groove on the outer wall is originally formed by the method of inserting a circular steel column rod 121 into a stainless steel pipe sleeve 122 with a thread and a single groove on an outer wall for welding, wherein the circular steel rod 121 can also be formed by a method of a powder metallurgy process of extruding an iron-based metal powder filler into the stainless steel pipe sleeve 122 with the thread and the single groove on the outer wall, and then sintering into the screw rod 12. The method of extruding an iron-based metal powder filler into the stainless steel pipe sleeve 122 with the thread and the single groove on the outer wall of the powder metallurgy process can also perform various conventional fastening screw structures such as internal hexagonal, external hexagonal, cross-shaped, linear shaped or any shape, and then be sintered into the screw rod 12. The screw rod 12 with the thread and the single groove on the outer wall is not limited to form a lockable stainless steel screw pair with the head end nut 13 or the tail end screwing nut 14 as shown in the perspective view of the screw rod structure with the thread and the single groove on the outer wall of FIG. 1A; it can be utilized with drilling a hole in the metal steel plate, and then manufacturing a screw hole with a thread and a single groove on an inner wall by a traditional tapping method to replace the head end nut 13 or the tail end screwing nut 14 then for fastening the pin 18, and the purpose of never loosening or the purpose of pulling out the pin 18 for maintenance are achieved. The foresaid content is a supplement which provides the invention with more precise application, so that the device application of the variation structures of every components and completely achieving the purposes of preventing corrosion damage and fastening the fastening screw device to be never loosened by the lockable stainless steel screw pair in the eco-friendly fastener structure with a lockable stainless steel screw pair, is more exciting and diverse.

Although the embodiments of the invention are described through the structure of the variation structures of every components and completely achieving the purposes of preventing corrosion damage and fastening the fastening screw device to be never loosened by the lockable stainless steel screw pair of the eco-friendly fastener structure with lockable stainless steel screw pairs at two ends, or the structure disclosed in the specification of the variation structures of every components and completely achieving the purposes of preventing corrosion damage and fastening the fastening screw device to be never loosened by the lockable stainless steel screw pair of the eco-friendly fastener structure with lockable stainless steel screw pair; it does not intend to limit the invention to the details shown in the figures. Since the embodiments of the invention may be changed by various modifications and structural and the invention may also be modified to various application or be modified by using other material to the invention by combining the prior art with current knowledge without departing from the spirit of the invention in any way thereof, such modifications should be and are intended to be included within the meaning and range of equivalents of the appended claims.

What is claimed is:

1. An eco-friendly fastener structure with a lockable stainless steel screw pair comprising:
a screw rod with a thread and a first single groove on an outer wall, wherein the screw rod with the thread and the first single groove on the outer wall is formed by welding a first stainless steel pipe sleeve and a circular steel column rod inserted in the first stainless steel pipe sleeve, and the thread and the first single groove is provided on an outer wall of the first stainless steel pipe sleeve;
the circular steel column rod, wherein an outer diameter of the circular steel column rod is equal to an inner diameter of the first stainless steel pipe sleeve;
the first stainless steel pipe sleeve, made by rolling the thread of a screw on the outer wall of the first stainless steel pipe sleeve and cutting the first single groove on the outer wall in a direction parallel to a central axis;
the first single groove, located in a head end part of the screw rod provided with the thread and the first single groove on the outer wall and defined as a screw rod head end groove, and the first single groove located in a screw rod tail end part of the screw rod provided with the thread and the first single groove on the outer wall and defined as a screw rod tail end groove;
a head end nut, formed by welding a head equilateral hexagonal steel column with a round hole and a head stainless steel pipe sleeve inserted therein, wherein a thread and a head single groove are provided on an inner wall of the head stainless steel pipe sleeve, and the head single groove is parallel to a central axis of the head end nut;
a tail end screwing nut, formed by welding a tail equilateral hexagonal steel column with an another round hole and a tail stainless steel pipe sleeve inserted therein, wherein a thread and a plurality of grooves is provided on an inner wall of the tail stainless steel pipe sleeve, and wherein the plurality of grooves are respectively parallel to a central axis of the tail end screwing nut and are in parallel and are equally and mutually separated from each other on the inner wall of the nut at a same angle;
two fastened objects;
two gaskets, wherein a first gasket is arranged between the head end nut and the two fastened objects, and a second gasket is arranged between the two fastened objects and a spring gasket;
the spring gasket, the spring gasket is arranged between the second gasket and the tail end screwing nut;
a fastening screw device composed of a pin component, wherein a length of the pin is greater than or equal to that of the screw rod with the thread and the first single groove on the outer wall, and the device first rotates the head end nut into the head end of the screw rod, aligns the head single groove with the screw rod head end groove, and then inserts the pin into a head common groove formed by the head single groove and the screw rod head end groove from the head end nut side, such that a lockable screw rod head end screw pair is formed, the lockable screw rod head end screw pair locked by first inserting the pin can be fixed to support a force of rotating of the tail end screwing nut to fasten the two fastened objects, and further screws tightly the tail end screwing nut to fasten the two fastened objects by screwing the tail end screwing nut after the spring gasket snugged tightly until two functions are achieved simultaneously, wherein a first function is to reach a predetermined tightening force value; and a second function is to achieve the forming of rotating the tail end screwing nut until one groove of the plurality of grooves thereof is aligned to the screw rod head end groove and then extending and inserting the pin into a tail common groove formed by the one groove of the plurality of grooves of the tail end screwing nut and the screw rod head end groove, to simultaneously achieve the purposes of preventing corrosion damage and fastening the fastener structure to be never loosened by the lockable stainless steel screw pair.

2. The eco-friendly fastener structure with a lockable stainless steel screw pair according to claim 1, wherein the tail end screwing nut is provided with the thread and three or six grooves on an inner wall.

3. The eco-friendly fastener structure with a lockable stainless steel screw pair according to claim 1, wherein the screw rod with the thread and the first single groove on the outer wall is formed by performing a powder metallurgy process in the first stainless steel pipe sleeve, and the powder metallurgy process comprises extruding a metal powder filler into the first stainless steel pipe sleeve for forming, and then sintering to form the screw rod.

4. The eco-friendly fastener structure with a lockable stainless steel screw pair according to claim 1, wherein the head equilateral hexagonal steel column with the round hole therein is a stainless steel column.

5. The eco-friendly fastener structure with a lockable stainless steel screw pair according to in claim 1, wherein the tail equilateral hexagonal steel column with the another round hole therein is a stainless steel column.

* * * * *